Patented Feb. 21, 1950

2,498,622

UNITED STATES PATENT OFFICE 2,498,622

REFRACTORY COMPOSITION

John M. Mochel, Corning, N. Y., assignor to Corning Glass Works, Corning, N. Y., a corporation of New York No Drawing. Application November 6, 1947, Serial No. 784,525

7 Claims. (Cl. 106—59)

This invention relates to refractory compositions and bodies and has for its primary object to provide bodies of great refractoriness having high density and superior resistance to corrosion and erosion by flowing molten glass.

Another object is to provide a refractory body of chromic oxide which is suitable for use in contact with flowing molten glass without objectionably coloring the glass.

Another object is to mold and fire chromic oxide so as to promote maximum shrinkage and bring it to the greatest possible density.

Another object is to render it non-conducting of electricity.

Chromic oxide, $Cr_2O_3$, is very refractory and many compositions have been proposed which contain it in various proportions, usually in the form of chromite ore. Such refractory compositions have not been employed for glass contacting refractories because they are too porous or too poorly bonded, as a result of which they are eroded by the molten glass and cause objectionable discoloration thereof. In some instances such discoloration, if reduced to a minimum, would not be objectionable. However, prior compositions containing chromic oxide have not been suitable for various reasons. They are not sufficiently dense to be satisfactorily resistant to corrosion and erosion by the molten glass. Moreover, chromic oxide is a semi-conductor of electricity when heated at elevated temperatures and this is objectionable in a refractory body which it is desired to use in connection with the electrical melting of glass without it being a part of the electrical circuit.

I have now discovered that these difficulties are overcome and the foregoing objects may be attained by using a composition which, exclusive of impurities, consists of $Cr_2O_3$, $TiO_2$, and an alkaline earth metal oxide (RO), the $Cr_2O_3$ being at least 80%, the $TiO_2$ being from about 1% to about 15% and the ratio $TiO_2/RO$ being from about .5/1 to about 5/1.

I have found that when $TiO_2$ and an alkaline earth metal oxide, MgO, CaO, SrO or BaO, in proper proportions are introduced into a refractory body composed of $Cr_2O_3$, they act jointly as a mineralizing or shrinking agent for the $Cr_2O_3$ and also cause a very decided increase in the electrical resistivity of the body. Although the composition may contain 80% $Cr_2O_3$, it preferably should contain at least 90% $Cr_2O_3$, the remainder being $TiO_2$ and alkaline earth oxide exclusive of impurities. Neither the alkaline earth oxide nor $TiO_2$ is effective when used alone. Maximum effect is produced by 8% $TiO_2$ and 2% CaO, or 4% $TiO_2$ and 2% SrO, or 2% $TiO_2$ and 2% BaO, but other amounts and ratios are also effective to some extent at least, as will appear.

For best results I have found it desirable to employ a relatively pure and finely powdered $Cr_2O_3$. The composition is mixed and molded in the usual manner by slip casting or pressing. Since the alkaline earth metal oxides are slightly soluble in water, they should be introduced into the batch as the carbonates. After being molded the body is dried and fired at temperatures up to 1550° C. and above.

Without limiting the invention thereto the following compositions in percent by weight were fired at a maximum temperature of 1550° C. and show the change in density and percentage of voids which is caused by the addition of $TiO_2$ and an alkaline earth metal oxide to $Cr_2O_3$.

| No. | $Cr_2O_3$ | $TiO_2$ | CaO | SrO | BaO | Apparent Density | Percent Voids | Ratio $TiO_2/RO$ |
|---|---|---|---|---|---|---|---|---|
| 1 | 85 | 12 | 3 | | | 4.38 | 13 | 4/1 |
| 2 | 90 | 8 | 2 | | | 4.51 | 12 | 4/1 |
| 3 | 95 | 4 | 1 | | | 4.14 | 16 | 4/1 |
| 4 | 97.5 | 2 | .5 | | | 3.82 | 26 | 4/1 |
| 5 | 98.75 | 1 | .25 | | | 3.63 | 29 | 4/1 |
| 6 | 96 | 2 | 2 | | | 3.34 | 36 | 1/1 |
| 7 | 95 | 4 | | 1 | | 3.63 | 30 | 4/1 |
| 8 | 94 | 4 | | 2 | | 3.89 | 25 | 2/1 |
| 9 | 93 | 4 | | 3 | | 3.81 | 27 | 1.5/1 |
| 10 | 97.6 | 2 | | | .4 | 3.28 | 37 | 5/1 |
| 11 | 97.3 | 2 | | | .7 | 3.41 | 34 | 3/1 |
| 12 | 96.75 | 2 | | | 1.25 | 3.68 | 29 | 1.6/1 |
| 13 | 96 | 2 | | | 2 | 4.0 | 23 | 1/1 |
| 14 | 95 | 2 | | | 3 | 3.95 | 24 | .66/1 |
| 15 | 100 | | | | | 3.13 | 40 | |

Composition 15 shows for comparison the apparent density and percentage of voids which characterize a body composed of $Cr_2O_3$ alone. Composition 2 contains the optimum amounts and ratio of $TiO_2$ and CaO; composition 8 contains the optimum amounts and ratio of $TiO_2$ and SrO; composition 13 contains the optimum amounts and ratio of $TiO_2$ and BaO.

A small bar of composition 2 was tested by partly immersing it for three days in molten glass of a composition commonly used. Its resistance to corrosion was far superior to that of the refractories previously used with that glass. The electrical resistivity of these compositions is very high, even at elevated temperatures.

I claim:

1. A refractory composition which, exclusive of impurities, consists of $Cr_2O_3$, $TiO_2$ and an alkaline earth metal oxide (RO) selected from the class consisting of MgO, CaO, SrO and BaO, the $Cr_2O_3$ being at least 80%, the $TiO_2$ being from about 1% to about 15% and the ratio $TiO_2/RO$ being from about .5/1 to about 5/1.

2. A refractory composition which, exclusive of impurities, consists of $Cr_2O_3$, $TiO_2$ and CaO, the $Cr_2O_3$ being at least 80%, the $TiO_2$ being from about 1% to about 15% and the ratio $TiO_2/CaO$ being from about .5/1 to about 5/1.

3. A refractory composition which, exclusive of impurities, consists of approximately 90% $Cr_2O_3$, 8% $TiO_2$ and 2% CaO.

4. A refractory composition which, exclusive of impurities, consists of $Cr_2O_3$, $TiO_2$ and SrO, the $Cr_2O_3$ being at least 80%, the $TiO_2$ being from about 1% to about 15% and the ratio $TiO_2/SrO$ being from about .5/1 to about 5/1.

5. A refractory composition which, exclusive of impurities, consists of approximately 94% $Cr_2O_3$, 4% $TiO_2$ and 2% SrO.

6. A refractory composition which, exclusive of impurities, consists of $Cr_2O_3$, $TiO_2$ and BaO, the $Cr_2O_3$ being at least 80%, the $TiO_2$ being from about 1% to about 15% and the ratio $TiO_2/BaO$ being from about .5/1 to about 5/1.

7. A refractory composition which, exclusive of impurities, consists approximately of 96% $Cr_2O_3$, 2% $TiO_2$ and 2% BaO.

JOHN M. MOCHEL.

REFERENCES CITED

The following references are of record in the file of this patent:

UNITED STATES PATENTS

| Number | Name | Date |
| --- | --- | --- |
| 2,271,362 | Field | Jan. 27, 1942 |
| 2,271,364 | Field | Jan. 27, 1942 |